UNITED STATES PATENT OFFICE.

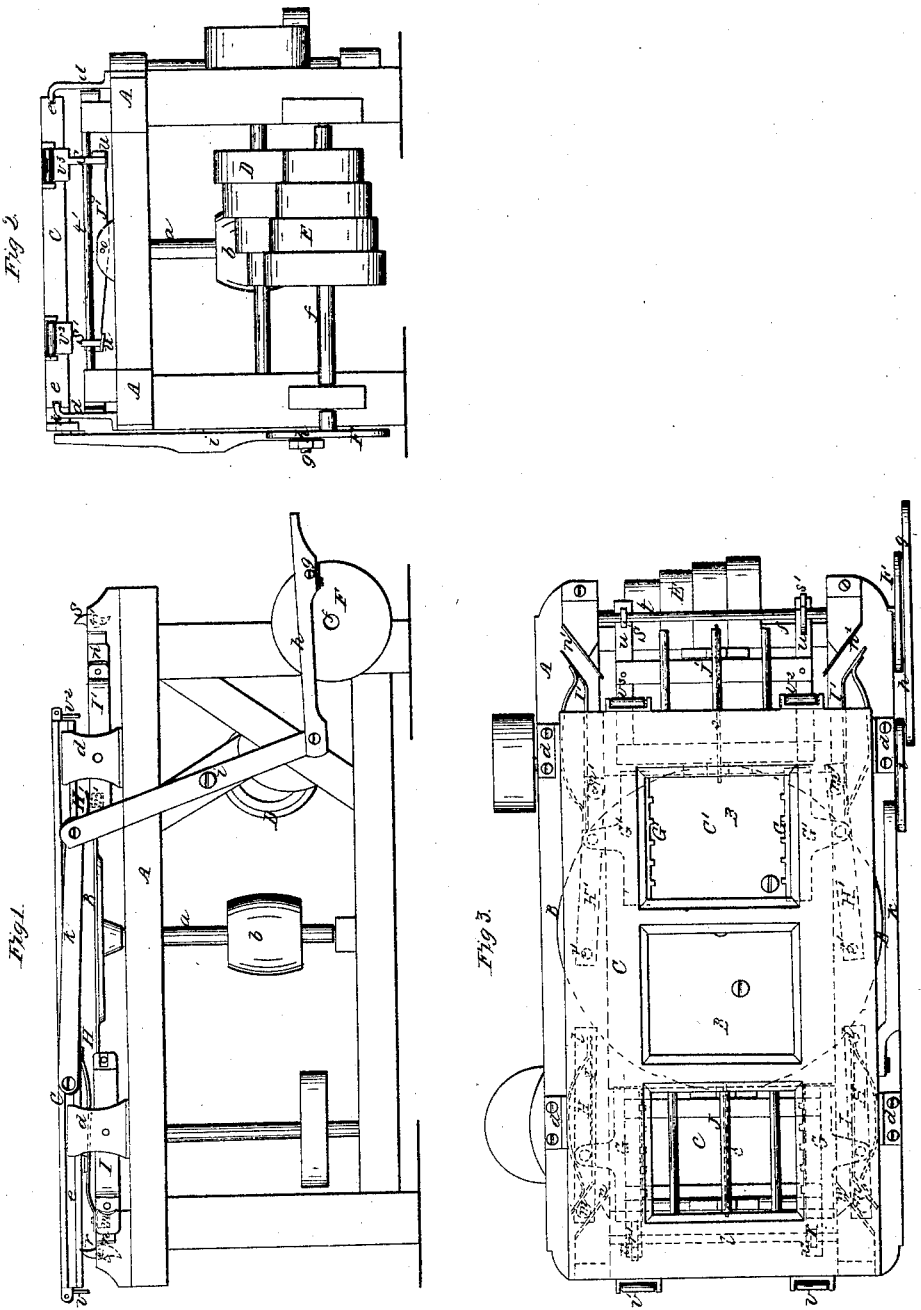
L. Beaudreau,
Sawing Shingles.
N° 24,985.    Patented Aug. 9, 1859.

LAURENT BEAUDREAN, OF FOND DU LAC, WISCONSIN.

SHINGLE-MACHINE.

Specification of Letters Patent No. 24,985, dated August 9, 1859.

*To all whom it may concern:*

Be it known that I, LAURENT BEAUDREAN, of Fond du Lac, in the county of Fond du Lac and State of Wisconsin, have invented a new and useful Improvement in Shingle-Machines; and I do hereby declare that the following is a full, clear, and exact description of the same, reference being had to the accompanying drawings, forming a part of this specification, in which—

Figure 1, represents a side elevation of a shingle machine constructed according to my improvement. Fig. 2, an end view of the same, and Fig. 3, a top view or plan.

Similar letters of reference, in each of the several figures indicate corresponding parts.

My improvement relates to that class of shingle machines in which the bolt or block lying inclined is fed up to and against or past a circular revolving saw, and in which, after the one shingle is cut from the block, the latter, previous to its next feed, is automatically released from grip and tipped in a reverse direction and gripped, to effect a succeeding cut, and so on in succession throughout the thickness of the bolt, that is thus cut up into shingles the butts and tip ends of which are taken alternately from each side of the bolt. And the nature of my invention consists in a novel combination and arrangement of means for thus operating by the one saw, on two bolts or blocks, substantially in the manner hereinafter described.

To enable others, skilled in the art, to make and use my invention, I will proceed to describe its construction and operation.

The frame A, of the machine may be constructed in any suitable manner.

B, is an upper horizontal circular saw, which may be arranged in the center of the frame and of diameter to extend nearly across it. Motion is given to the circular saw B, by a pulley $b$, on its vertical shaft $a$, and band connecting said pulley with any suitable driver.

C, is a horizontal, longitudinally reciprocating carriage, divided into two end compartments $c$, $c'$, and arranged for traverse over the saw, and guided in said traverse by guide cleats $d$, $d$, secured to the frame and having upper lips made to enter grooves $e$, $e$, in and along the sides of the carriage C.

D, is a cone of pulleys, driven by any suitable power and designed to communicate, by belt, rotary motion to a second cone of pulley E, on the shaft $f$, on which is hung a disk F, that, by means of an eccentric or wrist pin $g$, connecting rod $h$, rocking beam $i$, and link rod $k$, serves to give to the carriage C, its required reciprocating motion, backward and forward over the frame A, in direction of the length of the latter.

The two end compartments $c$, $c'$, in the carriage C, answer to hold within them the bolts or blocks to be cut up into shingles, either compartment containing a bolt, or tiers of bolts as the case may be. Said compartments are made open at their bottom, and are provided on either of their sides with dogs or toothed clamps G, G, and G', G', to hold the bolt in each. These clamps are jointed to bars H, H, H', H', running lengthwise of the carriage and pivoted, at their one end, by pins $l$, $l$, $l'$, $l'$, to the sides of the carriage beneath, and carrying, at their other or free end, rollers $m$, $m$, $m'$, $m'$. Said rollers, in the reciprocating travel of the carriage, rub against and along springs I, I, I', I', which serve to keep the clamps G, G, G', G', in bite with the bolts or blocks under operation, and said clamps, or either end pair of said clamps are released alternately from such bite or grip of the bolt, as the reciprocating carriage approaches its end travel in the one direction and as it commences its return stroke, by the rollers $m$, $m$, or $m'$, $m'$ entering and working in slots or openings bound on the interior by inclined guiding plates $n$, $n$, $n'$, $n'$, against which the rollers press and acting on the bars H, H, or H', H', release the clamps from their bite on the bolt.

J, J', are two horizontal cradles arranged near each end of the main frame and situated between the top of said frame and bottom of the reciprocating carriage. These cradles are hung on central trunnions $o$, the axes of which lie in direction of the reciprocating travel of the carriage C, to permit of either side of each cradle being tipped up, to give the requisite taper to the shingle. Said cradles are thus tipped alternately, and alternately tipped up on opposite sides, each cradle, by means of cams $r$, $r'$ and $s$, $s'$, hung on fixed cross shafts $t$, $t'$ and acting against or on bars $u$, projecting outwardly on opposite sides from the ends of the cradles, and by means of hinged flaps or pawls $v$, $v'$, $v^2$, $v^3$, secured to the ends of the reciprocating carriage and acting alternately in the motion of the carriage, on the cams $r$, $r'$, $s$, $s'$ to turn the shafts $t$, $t'$, on which said cams are hung, but only serving to turn said shafts in one direction, the hinged flaps above referred to loosely riding over the cams in the return stroke of the carriage.

From the foregoing description of parts and their action, a mechanic conversant with other shingle machines will readily understand the *modus operandi* of the present by the following further brief reference thereto.

A bolt or block being inserted in each of the end compartments $c$, $c'$, of the carriage C, the reciprocating traverse of the latter causes the saw B, to cut a shingle from each bolt alternately, the one bolt being forced up to as the other bolt is receding from the action of the saw, by which arrangement little or no time is lost and the saw kept almost continually at work in cutting shingles which are formed in rapid succession at either end of the machine alternately.

The rocking cradles J, J', serve to incline the bolts to the required taper of the shingle and to alternate, for the saving of stuff as heretofore practiced, the sides of the block from which the butt of the shingle is cut, by each one of the hinged flaps $v$, $v'$, $v^2$, $v^3$, alternately operating as the reciprocating carriage is completing its stroke, on one of the several cams $r$, $r'$, $s$, $s'$, to turn the shaft on which said cam is hung and, by the action of the other cam on the same shaft on one of the projecting bars $u$, of the cradle, to depress said cradle at the one side, which action is reversed, and the cradle tipped to incline in an opposite direction, by the next succeeding action of the cams, alike at both ends of the carriage, as said cams alternately act on opposite sides of each cradle by the alternate action of the hinged flaps (one at a time) on the one cam only of each shaft alternately, each reciprocating movement of the carriage C. As either pair of toothed clamps G, G, or G', G', are alternately released from grip of the bolt, by the means before described, during the traverse of the carriage at the end of the one stroke and beginning of another, the bolt or block then necessarily adjusts itself to the inclination of the cradle J, or J', on which it rests or drops, and on the rollers $m$, $m$, or $m'$, $m'$, coming again in the return of the carriage into frictional pressure against the springs I, or I', the grip of the adjusted bolt is again effected by the clamps and so on for each succeeding cut and return of the bolt. Thus both bolts are released and gripped automatically and a continuous (or nearly so) shingle-cut kept up without waste of material, by but one reciprocating carriage frame or double carriage or two carriages similarly operating and intermediate revolving saw and this in a manner as efficient as it is simple.

What I claim as my invention and desire to secure by Letters Patent, is—

The relative arrangement, for united operation of the intermediate circular revolving saw B, open reciprocating double carriage C, $c$, $c'$, toothed clamps G, G', bars H, H', rollers $m$, $m'$, springs I, I', inclined or curved guiding plates $n$, $n'$, horizontal rocking cradles J, J', cams $r$, $r'$, and $s$, $s'$, shafts $t$, $t'$, bars $u$, and hinged flaps or pawls $v$, $v'$, $v^2$, $v^3$; all substantially in the manner and for the purpose herein described.

LAURENT BEAUDREAN.

Witnesses:
J. A. SMITH,
FRANKLIN H. WAITE.